May 25, 1948.   H. S. HALBEDEL ET AL   2,442,290
PRODUCTION OF FLUOROACETONITRILE

Filed March 23, 1946

H.S. Halbedel
S.Z. Cardon
W. J. Shenk
INVENTORS.
BY
William H Brown

UNITED STATES PATENT OFFICE 2,442,290

PRODUCTION OF FLUOROACETONITRILE

Harold S. Halbedel, Samuel Z. Cardon, and Wilbur J. Shenk, Cleveland, Ohio, assignors to The Harshaw Chemical Company, Elyria, Ohio, a corporation of Ohio Application March 23, 1946, Serial No. 656,749

3 Claims. (Cl. 260—464)

This invention relates to a method for producing monofluoroacetonitrile from monochloroacetonitrile.

We are aware that fluoroacetonitrile has been prepared by Swarts (Bull. Soc. Chim. Belg. 31, 364 (1922)) and accordingly we do not make any claim to novelty for the compound itself but only for the novel process for producing it. Swarts dehydrated fluoroacetamide to form fluoroacetonitrile, whereas we proposed to utilize the fluoroacetonitrile as an intermediate for the production of fluoroacetic acid, its esters, salts, amides etc.

We have discovered that fluoroacetonitrile can be prepared by the interaction of chloroacetonitrile with a suitable metal fluoride such as silver fluoride (AgF), mercury fluoride ($HgF_2$) or cadmium fluoride ($CdF_2$). Of these we prefer silver fluoride. The reaction may be carried out with the chloroacetonitrile in either the liquid or the vapor state. Chloroacetonitrile can be prepared by catalytic chlorination of acetonitrile, however the source of chloroacetonitrile is immaterial so far as this invention is concerned.

Figure 1:
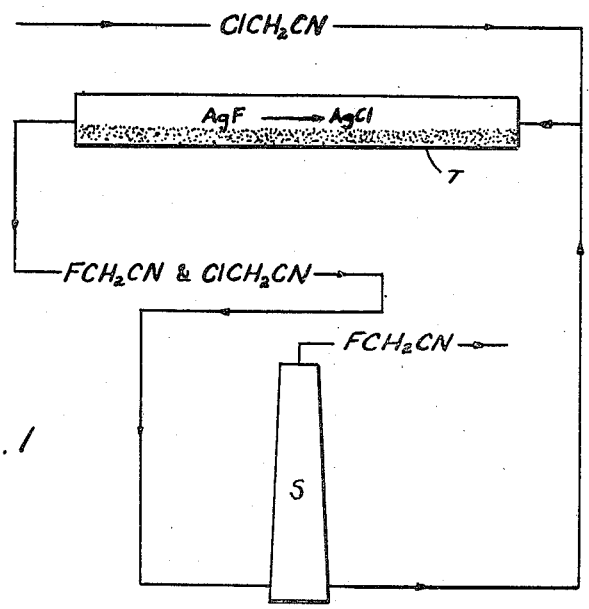
Figure 2:
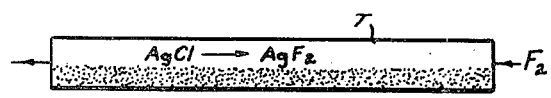
Figure 3:
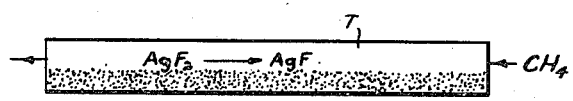

In the accompanying drawings, Fig. 1 is a flow diagram showing the fluorinating step; Fig. 2 is a flow diagram showing the first step in regenerating the silver fluoride (AgF) and Fig. 3 is a flow diagram showing the second step in regenerating silver fluoride.

The reaction between silver fluoride and chloroacetonitrile may be written as follows:

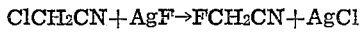

$$ClCH_2CN + AgF \rightarrow FCH_2CN + AgCl$$

The fluoroacetonitrile will be mixed with unreacted chloroacetonitrile and may be separated therefrom by fractional distillation since the boiling points of these materials are separated by more than forty degrees. The silver chloride resulting can be regenerated by contact with fluorine which will give $AgF_2$, a compound which can be reduced to AgF by a suitable reducing agent. In the event mercury fluoride ($HgF_2$) is used as the fluorinating agent it can be regenerated from $HgCl_2$ by treatment with fluorine. If the fluorinating agent is cadmium fluoride ($CdF_2$) it can be regenerated from $CdCl_2$ by treatment with HF.

A commercially significant feature of our invention in its preferred embodiment is the fact that the fluorinating agent need not be handled but may remain on trays during repeated regenerations while the material to be fluorinated and the regenerating media in gaseous form are alternately passed over it. Under favorable operating conditions the fluorinating agent may be used and regenerated many times without any handling at all. If the conditions are allowed to depart too much from the optimum, it may be necessary occasionally to remove the fluorinating agent and crush it to restore its normal powder form.

In Fig. 1 we have indicated the flow diagram for the fluorination of chloroacetonitrile. The fluorinating agent (AgF) is placed in a container T which may take the form of a tray or a series of trays within an enclosed chamber. The chloroacetonitrile in vapor phase is passed over the fluorinating agent in the container T where a portion thereof is converted to fluoroacetonitrile. The mixture of vapors of chloroacetonitrile and fluoroacetonitrile is separated out by fractional distillation and the chloroacetonitrile is returned to the fluorinating chamber T. In the fluorinating chamber meanwhile, the AgF is being converted to AgCl. When this has progressed to a point that the yield of fluoroacetonitrile is uneconomic, the flow of gases is stopped and the fluorinating agent is regenerated. The first step in the regeneration is accomplished (see Fig. 2) by passing fluorine over the material in the container T which at the beginning of the regeneration consists of a mixture of AgF and AgCl, mostly AgCl. After the fluorine flow has been continued long enough to convert most if not all the AgCl to $AgF_2$, the flow of fluorine is stopped and $CH_4$ or other suitable reducing agent is passed over the mixture of $AgF_2$, AgF and AgCl in the container T (see Fig. 3) whereby the $AgF_2$ is converted to AgF. The fluorinating agent is then ready for further use for fluorinating additional quantities of chloroacetonitrile.

While we prefer to operate according to the method just described, we may use mercury fluoride or cadmium fluoride as the fluorinating agent. If mercury fluoride is used, the regeneration requires only one step, viz., passing fluorine over the mercury chloride-mercury fluoride mixture in the trays. Likewise in the case of cadmium fluoride, only one regeneration step is required, viz., passing anhydrous hydrogen fluoride over the cadmium chloride-cadmium fluoride mixture in the trays. Again, we may use other gaseous reducing agents such as other gaseous hydrocarbons and mixtures thereof, illuminating gas, CO, waste petroleum refinery gases and the like. Pure hydrogen is too active and reduces some of the $AgF_2$ to metal.

The reaction may be carried out in the liquid phase if desired. In this case, a mixture of AgF and $ClCH_2CN$ may be refluxed together with vigorous stirring until there is no further lowering of temperature. The liquid phase may then be separated from the solid phase by decantation, filtration or the like and the product may be separated from the unreacted chloroacetonitrile by fractional distillation. The AgCl may then be reconverted to AgF by being placed in trays and subjected to the action sequentially of fluorine and a reducing agent.

For carrying out the vapor phase reaction the temperature of the fluorinating agent in the trays may be kept between 126° C. and 300° C.

The following examples will serve to illustrate the invention:

*Example I*

Three hundred parts by weight of monochloroacetonitrile were passed over a bed of 310 parts by weight of finely divided AgF, the vapors being recycled several times. The temperature of the bed of AgF was maintained between 126° C. and 300° C. at all times. In order to determine whether the reaction occurred at the lower temperatures, temperatures of 135° C., 200° C. and 300° C. were tried out and it was found that conversion took place throughout the temperature range. We concluded that any of these temperatures could be used with practicable results. The vapors were condensed and fractionated between passes at the different temperatures to determine whether further reaction had occurred. After the final passage, the total condensates were fractionated, yielding 38 parts by weight of fluoroacetonitrile, boiling point 80° C. to 84° C. The mixture of AgF and AgCl in the bed was regenerated by passing fluorine over it until there was no further evolution of chlorine after which methane was passed over it until there was no further evolution of HF. The bed of AgF was then used for fluorination of a further quantity of chloroacetonitrile.

*Example II*

128 parts of silver fluoride, AgF and 150 parts of chloroacetonitrile were allowed to reflux with vigorous stirring. The initial reflux temperature was 125° C. At the end of 40 minutes the temperature had dropped to 103° C. No further lowering of temperature occurred over a period of fifteen minutes and the stirring and heating was discontinued. The liquid was decanted and fractionally distilled. 19.0 parts of fluoroacetonitrile boiling at 80° C.–85° C. were collected.

Having thus described our invention, what we claim is:

1. In a process for preparing monofluoroacetonitrile, the step of passing monochloroacetonitrile in vapor phase over a mass of argentous fluoride.

2. In a process for preparation of monofluoroacetonitrile, the step of passing monochloroacetonitrile in vapor phase over a mass of finely divided argentous fluoride maintained at temperatures between the boiling point of monochloroacetonitrile and 300° C.

3. In a process for preparation of monofluoroacetonitrile, the steps of passing monochloroacetonitrile over a bed of finely divided argentous fluoride maintained at a temperature between 126° C. and 300° C. and converting the resulting AgCl in said bed back to AgF by passing sequentially fluorine and a gaseous carbonaceous reducing agent over said bed.

HAROLD S. HALBEDEL.
SAMUEL Z. CARDON.
WILBUR J. SHENK.

REFERENCES CITED

The following references are of record in the file of this patent:

UNITED STATES PATENTS

| Number | Name | Date |
|---|---|---|
| 2,192,143 | Midgley et al. | Feb. 27, 1940 |
| 2,403,576 | Bradley | July 9, 1946 |

FOREIGN PATENTS

| Number | Country | Date |
|---|---|---|
| 117,464 | Australia | Sept. 16, 1943 |

OTHER REFERENCES

Moissan, Comptes Rend. (Fr. Acad. Sci.), vol. 107, page 1155, (1888).

Swarts, Bull. Soc. Chim. de Paris (3), vol. 15, pages 1134–1135 (1896).

Finger et al., Trans. Ill. State Acad. Sci., vol. 29, pages 89–90 (1926).

Ruff et al., Zeit. fur Anorg. & Allg. Chemie, vol. 219, pages 143–148 (1934).

Simons et al., J. Am. Chem. Soc. vol. 65, pages 2064–2066 (1943).

Simons et al., J. Am. Chem. Soc. vol. 65, pages 389–392 (1943).